US009824544B2

(12) United States Patent
Moskowitz

(10) Patent No.: US 9,824,544 B2
(45) Date of Patent: Nov. 21, 2017

(54) METHODS OF PLAYING WAGERING GAMES WITH THE KENO SYSTEM

(71) Applicant: Ahmnon D. Moskowitz, Rockville, MD (US)

(72) Inventor: Ahmnon D. Moskowitz, Rockville, MD (US)

( * ) Notice: Subject to any disclaimer, the term of this patent is extended or adjusted under 35 U.S.C. 154(b) by 61 days.

(21) Appl. No.: 14/668,908

(22) Filed: Mar. 25, 2015

(65) Prior Publication Data

US 2015/0339878 A1 Nov. 26, 2015

Related U.S. Application Data

(60) Provisional application No. 61/970,249, filed on Mar. 25, 2014.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/329* (2013.01); *G07F 17/3211* (2013.01)

(58) Field of Classification Search
CPC .. A63F 3/06; A63F 3/061; A63F 3/062; A63F 3/0645; G07F 17/32; G07F 17/329
See application file for complete search history.

(56) References Cited

U.S. PATENT DOCUMENTS 5,791,991 A * 8/1998 Small .................... A63F 3/0645 463/41
5,813,911 A * 9/1998 Margolin .............. A63F 3/0645 463/19

* cited by examiner

*Primary Examiner* — Kevin Y Kim
(74) *Attorney, Agent, or Firm* — Richard Baker

(57) ABSTRACT

A method of playing a game that uses the numbers generated by a Keno game is described. The method includes i) receiving a wager from a player, ii) the player selecting to play a matrix-like game displaying through a display medium the player selected variables, with the matrix containing subsets each with a plurality of numbers, the subsets defined by linear contiguous trajectories; vertical, horizontal and diagonal; the subsets including generally equivalent amounts of variables, each subset including a variable that is shared with at least one other subset in the matrix and there are a plurality of subsets that include a variable that are mutually exclusive to another subset within the matrix, and iii) determining the gaming operators variables, displaying the gaming operators variables, determining whether the player wins or loses the game according to predetermined rules.

15 Claims, 6 Drawing Sheets

*More or less* *1.00*

| | | | | | | | | | |
|---|---|---|---|---|---|---|---|---|---|
| 3 | 4 | 8 | 9 | 10 | 11 | 12 | 14 | 15 | 19 |
| 20 | 25 | 27 | 28 | 29 | 30 | 31 | 33 | 35 | 37 |
| 41 | 47 | 53 | 54 | 55 | 56 | 57 | 58 | 58 | 64 |
| 65 | 66 | 67 | 71 | 74 | 75 | 76 | 77 | 78 | 79 |

Bar code game 201

FIG. 3a

*More or less pay table*

| | | | |
|---|---|---|---|
| 20 | 125,000 | 0 | 125,000 |
| 19 | 6000 | 1 | 6000 |
| 18 | 1000 | 2 | 1000 |
| 17 | 100 | 3 | 100 |
| 16 | 15 | 4 | 15 |
| 15 | 5 | 5 | 5 |
| 14 | 3 | 6 | 3 |
| 13 | 1 | 7 | 1 |

FIG. 3b

*Cubed*

| | | |
|---|---|---|
| V1 | V2 | V3 |
| V4 | free | V6 |
| V7 | V8 | V9 |

FIG. 4a

| | | |
|---|---|---|
| V1 | V2 | V3 |
| V4 | V5 | V6 |
| V7 | V8 | V9 |

FIG. 4b

Line subset 1 (Horizontal): {V1, V2, V3}
Line subset 2 Horizontal) : {V4, V5 V6}
Line subset 3 (Horizontal) :{ V7, V8, V9}
Line subset 4 (Vertical) :{ V1, V 4, V 7}
Line subset 5 (Vertical) : {V2 V5 V8}
Line subset 6 (Vertical) :{ V3, V6, V9}
Line subset 7: (diagonal) : {V1, V5. V9}
Line subset 8: (diagonal) : {V7, V7. V3}
Corner subset :{ V1, V3 V7, V9}
Total set : {V1, V2, V3, and V4 V5 V6 V7 V8}

FIG. 4c

| | |
|---|---|
| 1 line | 1 |
| 2 lines | 3 |
| 3 lines | 15 |
| 4 lines | 50 |
| 5 lines | 150 |
| 6 lines | 600 |
| 7 or 8 lines | 10,000 |

FIG. 4d

*KENO LINES*

| | | | |
|---|---|---|---|
| V1 | V2 | V3 | V4 |
| V5 | V6 | V7 | V8 |
| V9 | V10 | V11 | V12 |
| V13 | V14 | V15 | V16 |

FIG. 5a

| | | | |
|---|---|---|---|
| V1 | V2 | V3 | V4 |
| V2 | V4 | V1 | V3 |
| V5 | V6 | V7 | V8 |
| V7 | V5 | V8 | V6 |

FIG. 5b

*Keno MAX*

| | | | | |
|---|---|---|---|---|
| V1 | V2 | V3 | V4 | V5 |
| V6 | V7 | V8 | V9 | V10 |
| V11 | V12 | Vfree | V14 | V15 |
| V16 | V17 | V18 | V19 | V20 |
| V21 | V22 | V23 | V24 | V25 |

FIG. 5c

| | | | | |
|---|---|---|---|---|
| V1 | free | V2 | free | V3 |
| free | v4 | v5 | V1 | free |
| v6 | v7 | free | V8 | V2 |
| free | V9 | v10 | V3 | free |
| V4 | free | V6 | free | V9 |

FIG. 5d

METHODS OF PLAYING WAGERING GAMES WITH THE KENO SYSTEM

CROSS-REFERENCE TO RELATED APPLICATIONS

This application is a non-provisional Application, for which priority is claimed under 35 U.S.C. §119, of U.S. Provisional Patent Application No. 61/970,249, filed Mar. 25, 2014, and entitled "METHODS OF PLAYING WAGERING GAMES WITH THE KENO SYSTEM FIELD OF THE INVENTION," the entire content of the above identified patent application is incorporated herein by reference in its entirety.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

The present invention involves games to be played in conjunction with a Keno system.

BACKGROUND OF THE INVENTION

Keno is a game in which a player selects numbers from a grid of eighty squares, with each square numbered from one to eighty in sequence. The player first determines how many numbers (or "spots") to select. A player picks generally 1-10 numbers (or "spots"), the number of spots selected determines the payout odds. There are variations of Keno i.e. "Tatts keno" plays with a grid of 70 variables, and some casinos allow a player to pick up to 20 spots.

The conventional art in Keno has different ways of selecting the spots. In a "way bet" a player picks a combination of spots. Many times in way-keno, groups of numbers are separated by lines or circles. The groups are then combined together to make individual tickets for all the ways that a player wishes to play. Another method of selecting numbers is "Pattern Keno" U.S. Pat. No. 5,813, 911, 1998, Margolin teaches a method of selecting numbers by selecting shapes; there are no rules within that are unique to Keno.

The exemplary embodiments of the invention provide alternative ways to traditional Keno that are simple for a player to understand and can be played in conjunction with the Keno system in order to keep players excited within game play.

A player gets upset when they are watching Keno and are not matching many variables. An exemplary embodiment of the invention gives a player a means to win if only a minority of the players' variables match the gaming operator's variables.

Launching new games call for costly investments by the gaming operator and if it fails much is lost. An exemplary embodiment of the invention saves the gaming operator money in start-up and marketing costs by creating games to be played within the Keno System to reduce the costs of launching and operating a separate game.

SUMMARY OF THE INVENTION

The present invention relates to exemplary methods of playing games in conjunction with a Keno system.

An exemplary method of playing a game disclosed herein is "More or Less" to be played in conjunction with a KENO system. In this example embodiment, a player selects 40 variables from a grid of 80, the gaming operator selects 20 variables. The payouts for a player matching 0, 1, 2, 3, 4, 5, 6, 7 variables of the said 40 have a substantially equivalent pay table to a player matching 20, 19, 18, 17, 16, 15, 14, 13 of the said 40 with no payouts for a player matching 8, 9, 10, 11, 12.

The exemplary game "More or Less" does not necessarily need to have near symmetrical payouts or be played with 40 variables. It can be played with any amount of selected variable over 15; 15-20, 21-25, 26-30, 31-35, 36-40, 41-45, and 46-50, 51-55, 56-60. The game does need to pay a prize for matching all the selected variables, exactly all the selected variables less one, exactly all less two and exactly all less three, and for a payout for matching zero variables, exactly one variable, exactly two variables, and exactly three variables.

Another exemplary embodiment of a game is disclosed wherein a players' selected variables are to be are displayed upon a matrix on uniquely identifiable positions.

The matrix (see FIGS. 4*a*, 4*b*, 5*a*, 5*b*, 5*c*, 5*d*) contains subsets (Line subset 1-8, corner subset) each with a plurality of numbers (V1-V25), the subsets defined by linear contiguous trajectories (Line subset 1-8); vertical (Line subset 4-6), horizontal (Line subset 1-3) and diagonal (Line subset 7-8); the subsets contain generally equivalent amounts of variables, each subset contains a variable (V1-V25) that is shared with at least one other subset in the matrix and there are a plurality of subsets that contains a variable that are mutually exclusive to another subset within the matrix.

If a player matches all the variables (V1-V25) within a subset (Line subset 1-8, corner subset) a player is entitled to a value prize. If a player matches all of the numbers (V1-V25) in a plurality of subsets a player is entitled to a value payout that is generally higher than the combination of payouts the player would have received as if the subsets were won in separate games. The subsets that can be required for a player to match in order to win need not be limited to linear contiguous trajectories (Line subset 1-8), other subsets can be the following; the corners of the grid (corner subset), a letter shape, a number shape, heart shape, diamond shape or any other symbol or pattern shape.

The aforementioned exemplary embodiments of games can be played in conjunction with any KENO venue, such as an online lottery, gaming hall, instant game, or an electronic gaming device.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 3*a* is an illustration of a wage slip for the game "More or Less";

FIG. 3*b* is an illustration of a possible pay table for "More or Less";

FIG. 4*a* is an illustration of a game to be played in conjunction with the Keno grid with three rows and three columns;

FIG. 4*b* is an illustration of an alternative variation to 4A with no free variable;

FIG. 4*c* is a mathematical breakdown of possible subsets contained in 4A and 4B;

FIG. 4*d* is a possible pay table for the game illustrated in 4*a;*

FIG. 5*a* is an illustration of an exemplary embodiment of a game to be played in conjunction with the Keno grid with four rows and four columns;

FIG. 5*b* is an illustration of an alternative variation of the game in 5A with repeating numbers;

FIG. 5*c* is an illustration of an exemplary embodiment of a game to be played in conjunction with the Keno grid with five rows and five columns;

FIG. 5*d* is an illustration alternative game to 5*c* to be played with free variables and repeating numbers.

DETAILED DESCRIPTION OF THE EXEMPLARY EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
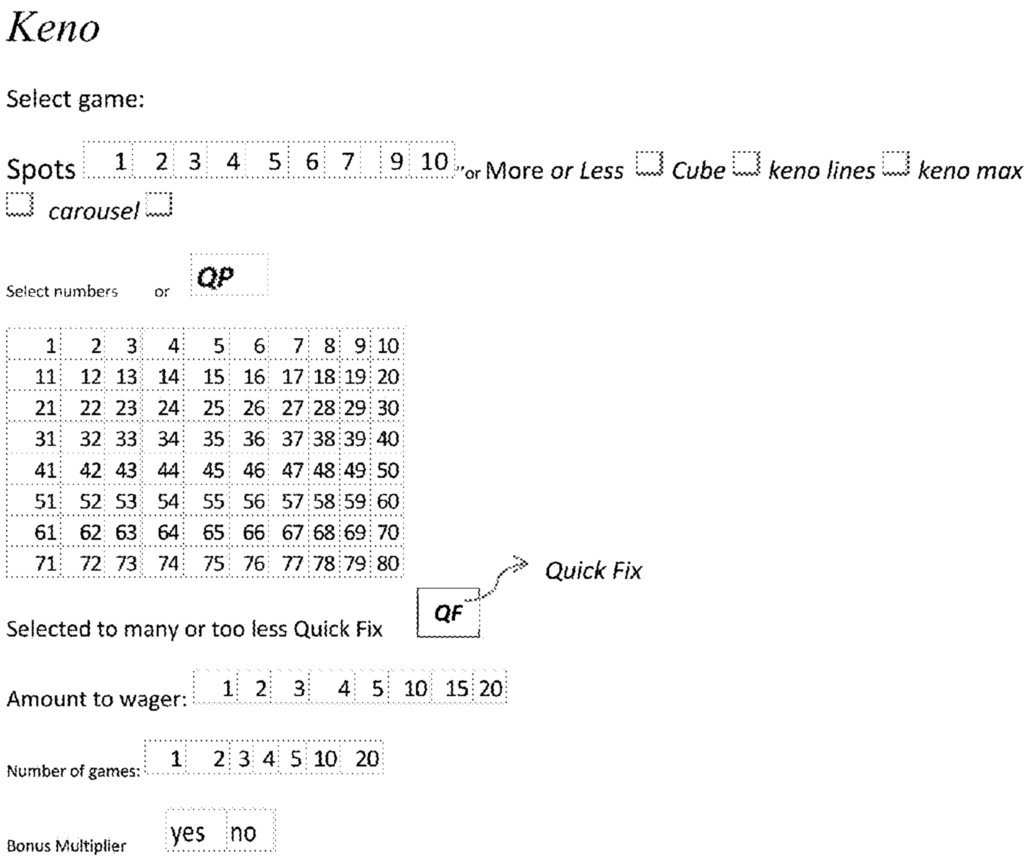
FIG. 1 is an illustration of a play slip for exemplary embodiments of games described herein.

FIG. 1 illustrates an exemplary embodiment of a standard play slip for KENO where a player marks the spots, spot selection, and amount of games. This play slip has two differences with other play slips: 1) it contains options to play games mentioned within this disclosure and 2) it contains a "Quick Fix" option. If a player selected too many or too few variables, either the player or the teller with the players permission would mark the indicia near "Quick fix" and the gaming operator's processor would randomly add or subtract (a) variable(s) from the player's selection as to conform to the spot selection.

Figure 2:
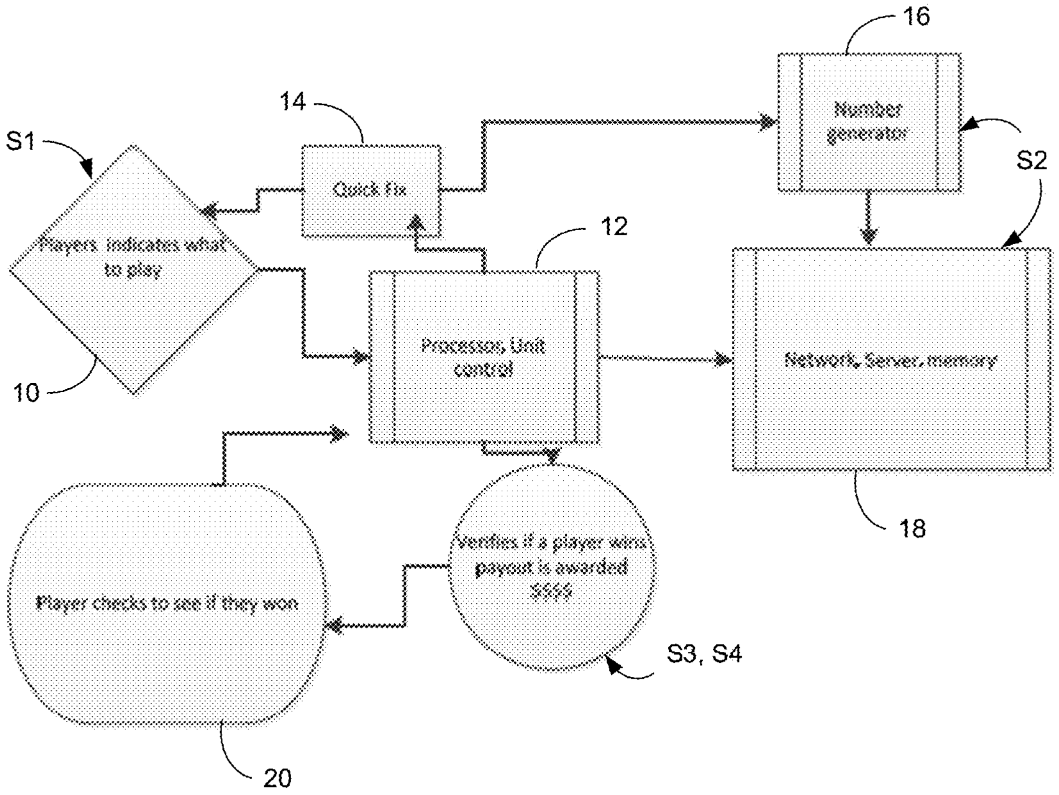
FIG. 2 is a flow chart schematically illustrating the interactions of a player and a gaming operator.

FIG. 2 is a flow chart of an exemplary game process in which a player selects a game. This can be done through a lottery network system, casino system, electronic gaming device system, or internet system, etc. A player can use a play slip, verbally indicate the selection for the teller to input, or select the options from a display screen.

Many gaming operators have a plurality of terminals that send and receive data via a centralized processing unit. The central processor is connected to a multitude of remote terminals with each terminal having the ability of sending and receiving data inputs to the central processing unit, with such data inputs including the identification of the playing console, the amount played, and the game selection which could be instant game or a delayed game. The terminal will either accept or reject the bet determining if it is valid or not. In a land based system a ticket identifying the characteristics of the bet would be printed. A means of verifying the validity of the ticket would also be printed on the ticket.

With reference to FIG. 2, generally, the steps include, but are not limited to the following. In step (S1), a player selects a game and wages money (e.g., using an input device or unit 10 or the like; or an operator inputs the selection on behalf of the player). If a selection is determined to be incorrect by a controller 12 (e.g., processor, control unit, etc.), the controller 12 can send the selection back to the player to manually correct the selection, or give the player the option to use a "Quick Fix" option 14, which can add or subtract variables to conform to the player's game selection. When the wager is determined to be consistent with game rules (e.g., predetermined rules, for example, stored in a memory 18), the controller 12 can accept the wager. In step (S2), a gaming operator can generate random numbers using, for example, an electronic random number generator 16 or the like, such as a mechanical blower, and in other situations the numbers can pre-determined (e.g., stored in memory 18, etc., which may be local or accessible over a network, etc.). In step (S3), the controller 12 (e.g., the gaming operators' computer central processing unit) can determine if a player won. In step (S4), the controller can be programmed to pay, authorize the payment of, or indicate (e.g., via a display 20 or printed medium) an award that corresponds to the players selection once verified.

FIG. 3*a* is an example of a "More or less" lottery ticket given to a player when a wager is made. There is a barcode at the bottom used to verify if the ticket is a winner. If this game is played on an electronic gaming device system or through the internet there could be a virtual ticket that may be associated with a record file entry in a database and the selected variables are displayed on a monitor.

FIG. 3*b* is an example of the pay table for the game "More or Less". In this example, the lottery operator has a more than 40% edge over the player consistent with state lottery games. Casinos or other gaming systems would likely want to increase the payouts so as to make the payouts more attractive to players. It can be appreciated the complete symmetry in payouts and there is a payout for all player sceneries with the exception of matching 8, 9, 10, 11, or 12, variables. Here there is a single top payout of $125,000 for matching all or none of the selected variables; however some lottery operators may want to have a progressive jackpot whereby the top prize increases every game that a player does not win.

An exemplary embodiment may have a generally symmetric payout since it will look alluring in marketing campaigns, however in accordance with this invention the amount variables and pay scales can vary as long as the players selected variables are at least 15 and there is a payout for matching; all, all less one, all less two, zero, exactly one and exactly two.

Illustrated in FIGS. 4*a*, 4*b*, 5*a*, 5*b*, 5*c*, 5*d*, and 4*e* are exemplary embodiments of games that are to be played alongside a Keno system, where the gaming operator selects 20 variables out of a grid of 80. Player's variables are displayed in a uniquely identifiable area in a display area separate from the Keno grid; the variables are indicated by numbers seceding V, the variables are contained in a grid within rows and columns. The player variables in the cell may be selected by a player, or generated by a random number selector, the numbers can be arranged sequentially, or non-sequentially. The variables within the cells are numbers to be matched with the gaming operator's selection, however bonuses or other symbols can be contained within, for example FIGS. 4*a*, 5*a*, and 5*b* contain a free variable in the center of the grid. The payout for matching a subset with two variables and a free variable is the same as matching three variables without the free variable.

In FIGS. 4*a* and 4*b*, the numbers are arranged in grid of 3 rows and 3 columns each of the variables (V1-V9) contained in a uniquely identifiable position within a cell. In FIG. 4*a*, there are 8 unique variables (V1-V4, V6-V9) with a free space in 4*b* there are 9 unique variables. FIG. 4*c* is a mathematical breakdown of the subsets (Line subset 1-8, corner subset) of FIGS. 4*a* and 4*b*; vertical (Line subset 4-6), horizontal (Line subset 1-3) diagonal (Line subset 7-8). The subsets are the representation of variables adjoined within the horizontal Line subset 1-3), diagonal (Line subset 7-8), vertical (Line subset 4-6) lines and the four corners (corner subset). A player wins a prize by matching all the variables in a subset; if a player matches a plurality of subsets they are entitled to a prize that is generally higher than the combination of payouts as if they would have matched the subsets in two separate games. A player wins the top prize by matching all the variables in all the subsets. FIG. 4*d* is a pay table for the game in FIG. 4*a*; if a player matches a line in the vertical (Line subset 4-6), horizontal (Line subset 1-3) or diagonal (Line subset 7-8)they are entitled to a value payout. If a player matches one line they are entitled to a dollar if a player matches a second they are entitled to $3, three lines $15, four Ines $50, five lines $150, six lines $600 and seven or eight lines $10,000. The top payout could be progressive, the payouts contained herein represent an edge consistent with government managed lotteries, non-government run gaming operators will likely want to increase the payouts mentioned herein.

In FIGS. 5*a* and 5*b*, there are 4 rows and 4 columns with 16 cells; FIG. 5*a* containing 16 unique variables and FIG. 5*b* containing 8 unique variables; a player receives a prize by matching a vertical, horizontal, or diagonal line and a more substantial prize for matching a plurality of lines. It is possible to have 16 individual unique variables and a top prize for matching not all but a majority of lines or variables. It can be appreciated that within the cube of FIG. 5*b* are only 8 unique player variables and no two identical variables are contained within a single subset.

In FIGS. 5*c* and 5*d*, there are 5 rows and 5 columns each containing a free space in the center; FIG. 5*c* contains 24 unique variables, FIG. 5*d* contains 10 unique variables and 9 free spaces, it can be appreciated that no two identical variables are contained in a single subset; a player receives a prize by matching a vertical horizontal or diagonal line and a more substantial prize for matching a plurality of lines. A gaming operator can decide to award prizes for matching a unique pattern within the grid. The pattern could be a diamond, heart shape, number shape, letter shape or some other symbol or pattern. A gaming operator can also offer a payout for matching both diagonals that would be generally higher than a payout for matching two other linear subsets. These games can be played in conjunction with bonuses or in conjunction with other features that are known in the art of Keno and Bingo.

Figure 5E:
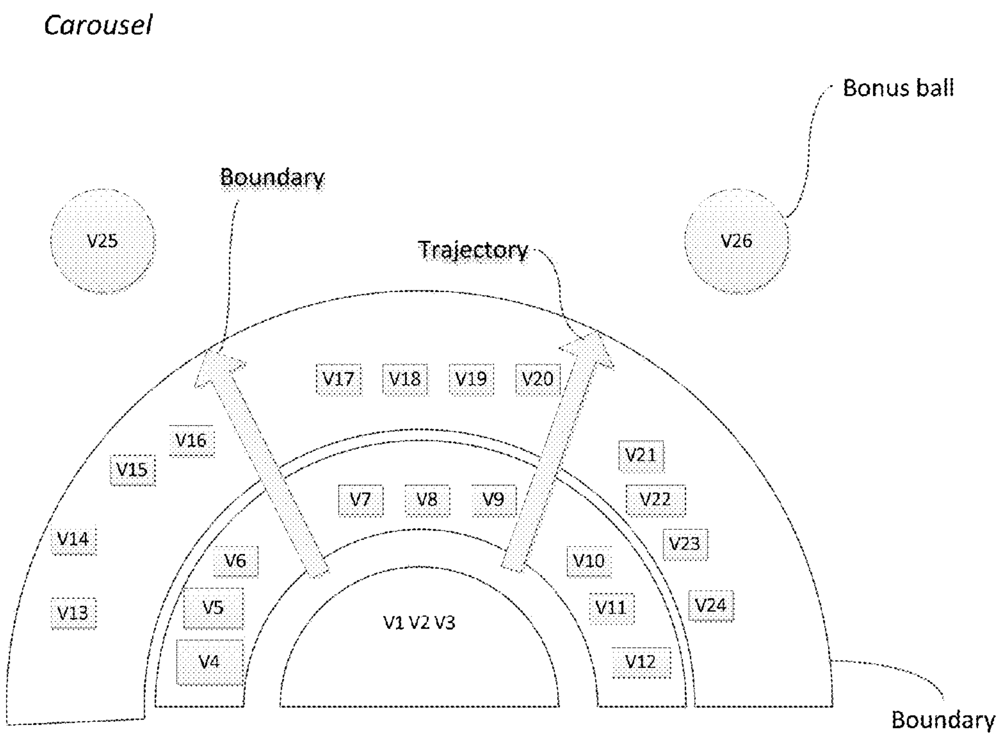
FIG. 5*e* is an illustration of an exemplary embodiment of a game played on a grid that is curvilinear.

The exemplary embodiment of this game does not need to be played as a cubed grid. In other examples, the game can be played on a grid that is generally rectangular, or it can be played on a grid that is letter-, number-, or symbol-shaped like a star or pyramid, etc. FIG. 5E is a game with numbers displayed upon on a grid that is curvilinear; a player has several ways to win; they receive a prize by matching variables within the boundaries and a prize for matching variables along the trajectory, and there are bonus balls.

To summarize, exemplary methods of playing games in conjunction with a Keno system are described above. In an example game, 40 variables are selected; the payouts to a player matching 0, 1, 2, 3, 4, 5, 6, and 7 variables of the 40 have substantially equivalent payouts to a player matching 20, 19, 18, 17, 16, 15, 14, and 13 of the 40. In another example game, a player's variables (V1-V25) are displayed on a matrix separate from the Keno grid. The Matrix contains a plurality of subsets defined by variables (V1-V25) in uniquely identifiable positions adjoined along linear contiguous trajectories. For each subset, a player matches with the gaming operators variables there is a prize. The subsets contain variables (V1-V25) that overlap each other; with the said overlapping variables each in a singularly uniquely identifiable area within the grid. If a player matches a plurality of subsets, the player is entitled to a prize that is generally higher than the combination of payouts as if they would have matched the subsets as separate games.

An exemplary embodiment is directed to a method of playing a game that uses the numbers generated by a Keno game in which the method comprises executing instructions on a processor in a computer to implement the following operations: receiving a wager from a player (e.g., input by a player), the player selection being, for example, at least 21 variables; displaying on a display medium (e.g., display, display device, etc.) the player's selected variables; determining the gaming operators variables (e.g., by a controller programmed to control the game); displaying the gaming operators variables (e.g., on a display); determining (e.g., by a controller programmed to control the game) whether the player wins or loses the game according to electronically stored predetermined rules, for example which are implemented by the processor on the computer, wherein the predetermined rules include a value payout for: i) matching all variables, exactly all variables less than one, and exactly all variables less than two; ii) matching zero variables, for matching exactly one variable, and exactly two variables; and resolving the wager according to an electronically stored pay table.

In an example, the payout for matching all variables and zero variables are generally equivalent (e.g., substantially equivalent), the payout for matching all variables less than one and exactly one are generally equivalent, the payout for matching all variables less than two and exactly two are generally equivalent (e.g., substantially equivalent). In another example, there is a payout for matching all variables less than three and exactly three, a payout for matching all variables less than four variables and exactly four variables.

Another exemplary embodiment is directed to a method of method of playing a game that uses the numbers generated by a Keno game, the method comprising executing instructions on a processor in a computer (e.g., by a controller programmed to control the game) to implement the following operations: a player selecting variables (V1-V25) for the game (e.g., a player inputting variables (V1-V25) into an input unit); displaying on a display medium (e.g., display, display device, etc.) the player's selected variables (V1-V25); displaying (e.g., on the display) the gaming operator's variables, for example, in the following arrangement; i) a player's selected variables (V1-V25) are displayed within a matrix (see FIGS. 4*a*, 4*b*, 5*a*, 5*b*, 5*c*, 5*d*) separate from the keno grid and each variable (V1-V25) is within a uniquely identifiable area, wherein the matrix has subsets (Line subset 1-8, corner subset), and a subset (Line subset 1-8, corner subset) is defined as a combination of variables (V1-V25) that if matched to the gaming operator's variables entitles a player to a value payout; ii) there are pluralities of subsets (Line subset 1-8, corner subset) that share a mutual variable; the said variable (V1-V25) is located in a uniquely identifiable area; iii) the said subsets (Line subset 1-8, corner subset adjoin the uniquely identifiable area of the said variable (V1-V25) within the display area; the method further including determining whether the player wins or loses the game according to electronically stored predetermined rules which are implemented by the processor on the computer (e.g., by a controller programmed to control the game), the predetermined rules including: i) if a player matches all variables (V1-V25) in a subset (Line subset 1-8, corner subset) to a gaming operators draw a prize is awarded; ii) at least one subset (Line subset 1-8, corner subset) within the matrix contains a variable (V1-V25) that is mutually exclusive to another subset within the matrix; and iii) if a player matches a plurality of subsets (Line subset 1-8, corner subset) they are entitled to a prize that is generally higher than the combination of payouts as if they would have matched the subsets (Line subset 1-8, corner subset) as two separate games; the method further including resolving the wager according to said electronically stored pay table.

In an example, a variable (V1-V25) in a subset (Line subset 1-8, corner subset is an automatic free variable within the game. In another example, the characters are displayed on horizontal (Line subset 1-3) and perpendicular lines (Line subset 4-6). In another example, the players selected numbers (V1-V9) are displayed on a grid comprising nine variables(V1-V9), three variables adjoined contiguously on the vertical trajectory (Line subset 4-6), and three variables adjoined contiguously on the horizontal (Line subset 1-3); the said horizontal and vertical trajectories transverse each other. In another example, the player's selected numbers (V1-V25) are displayed in a triangular formation. In another example, the numbers are displayed in a generally curvilinear formation. In another example, a variable selected by the player can be displayed within a plurality of uniquely identifiable positions; the said variable (V1-V25) belonging to separate subsets (Line subset 1-8, corner subset) within the game.

Another exemplary embodiment is directed to an apparatus or system for playing a game that uses numbers generated by a Keno game, the apparatus or system comprising a display; an input device; and a controller programmed to control the game based on an input from the input device and display indicia with respect to the game. The controller can be programmed to: receive a wager input by a player from the input device, with the player selection being at least 21 variables; display on the display the player's selected variables; determine the gaming operators variables; display the gaming operators variables; determine whether the player wins or loses the game according to electronically stored predetermined rules which are implemented by the processor on the computer, wherein the predetermined rules include: i) there is a value payout for matching all variables, exactly all variables less than one, and exactly all variables less than two; ii) there is a value payout for matching zero variables, for matching exactly one variable, and exactly two variables; resolving the wager according to an electronically stored pay table.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices. e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a terminal. In the alternative, the processor and the storage medium may reside as discrete components in a terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method of playing a Keno game with a printed ticket generated by a lottery gaming terminal, where the lottery gaming terminal comprises a controller that inputs instructions provided by a player on an input device for reading lottery play slips to create an output on a printed ticket, the method comprising:

- receiving selected numeric variables as marked on a play slip through provided by the player on the input device for reading lottery play slips on the lottery gaming terminal, for the game;
- transmitting the selected numeric variables to a lottery network system for storage;
- receiving identifying characteristics from the lottery network system;
- printing on the printed ticket the selected numeric variables and the identifying characteristics,
- wherein an arrangement of the selected numeric variables include:
  - i) the selected numeric variables being printed within a matrix separate from a Keno grid, with each selected numeric variable being within a display area, wherein the matrix has subsets including a combination of selected numeric variables that, if matched to gaming operator's variables, the printed ticket is a winner, where the subsets are defined by linear contiguous trajectories;
  - ii) a plurality of the subsets that share a mutual variable, wherein the mutual variable is located in a uniquely identifiable area; and
  - iii) the subsets adjoining the uniquely identifiable area of the mutual variable within the display area;
- receiving the gaming operators variables from the lottery network system;
- reading printed selected numeric variables and printed identifying characteristics from the printed ticket using the lottery gaming terminal;
- receiving stored identifying characteristics from the lottery network system;
- comparing the gaming operator's variables to the printed selected numeric variables on the printed ticket;
- validating the printed ticket using the printed identifying characteristics and the stored identifying characteristics; and
- determining whether the player wins or loses the game according to electronically stored predetermined rules.

2. The method of claim 1, wherein the predetermined rules include:

- i) if the player matches all of the selected numeric variables in a subgroup to the gaming operator's variables, a prize is awarded;
- ii) at least one subset within the matrix contains a mutually exclusive variable from a set of the selected numeric variables that is mutually exclusive to another subset within the matrix; and
- iii) if the player matches a second plurality of subsets, then the player is entitled to a prize according to an electronically stored pay table.

3. The method of claim 1, wherein the predetermined rules include:

- i) if the player matches all of the selected numeric variables in a subgroup to the gaming operator's variables, a prize is awarded;
- ii) at least one subset within the matrix contains a mutually exclusive variable from a set of the selected numeric variables that is mutually exclusive to another subset within the matrix;
- iii) if a player matches a second plurality of subsets, then the player is entitled to a prize that is higher than a combination of prizes in two separate games.

4. The method of claim 1, wherein a variable in the subset is an automatic free variable within the game.

5. The method of claim 1, wherein characters are displayed on horizontal and perpendicular lines.

6. The method of claim 1, wherein the selected numeric variables are displayed on a grid comprising nine selected numeric variables, three selected numeric variables adjoined contiguously on a vertical trajectory, and three selected numeric variables adjoined contiguously on a horizontal trajectory, wherein the horizontal and vertical trajectories transverse each other.

7. The method of claim 1, wherein the selected numeric variables are displayed in a triangular formation.

8. The method of claim 1, wherein the selected numeric variables are displayed in a substantially curvilinear formation.

9. The method of claim 1, wherein the selected numeric variables selected by the player can be displayed within a plurality of uniquely identifiable positions; the said selected numeric variable belonging to separate subsets within the game.

10. A lottery gaming terminal for playing a Keno game that uses a printed ticket, the lottery gaming terminal comprising:

- a printer for printing the printed ticket connected to a controller;
- an input device for reading lottery play slips, the input device for reading lottery play slips adapted to read a play slip and to read the printed ticket, wherein the input device for reading lottery play slips is connected to the controller;
- a network interface that connects to a lottery network system and connected to the controller; and
- the controller programmed to control the game based on an input received from the input device for reading lottery play slips as specified on the play slip and to print indicia with respect to the game,
- wherein the controller is programmed to:

receive selected numeric variables as specified on the play slip, by a player, for the game;

print on the printed ticket the selected numeric variables and identifying characteristics, where the identifying characteristics are received over the network interface in response to sending the selected numeric variables over the network wherein an arrangement of the gaming operator's variables include:

i) the selected numeric variables being displayed within a matrix separate from a Keno grid, with each selected numeric variable being within a uniquely identifiable area, wherein the matrix has subsets including a combination of selected numeric variables that, if matched to the gaming operator's variables, the printed ticket is a winner, where the subsets are defined by linear contiguous trajectories;

ii) a plurality of subsets that share a mutual variable, wherein the mutual variable is located in a uniquely identifiable area; and iii) subsets adjoining the uniquely identifiable area of the mutual variable within the display area;

read printed identifying characteristics and printed selected numeric variables from the printed ticket using the input device for reading lottery play slips;

validate the printed ticket using printed identifying characteristics;

compare the gaming operator's variables to the printed selected numeric variables; and determine whether the player wins or loses the game according to electronically stored predetermined rules.

11. The method of claim 1 wherein the subset trajectories are vertical, horizontal and diagonal.

12. The method of claim 1 wherein the subsets include equivalent amounts of selected numeric variables, each subset including a selected numeric variable that is shared with at least one other subset in the matrix.

13. The lottery gaming terminal of claim 10 wherein the subset trajectories are vertical, horizontal and diagonal.

14. The lottery gaming terminal of claim 10 wherein the subsets include equivalent amounts of selected numeric variables, each subset including a selected numeric variable that is shared with at least one other subset in the matrix.

15. A printed ticket generated by a lottery gaming terminal for a Keno game, the printed ticket comprising:

selected numeric variables displayed within a matrix separate from a Keno grid, with each of the selected numeric variables printed within the matrix in a display area, wherein the matrix has a plurality of subsets including a combination of selected numeric variables, where the plurality of subsets share a mutual variable, wherein the mutual variable is located in a uniquely identifiable area;

the plurality of subsets adjoining the uniquely identifiable area of the mutual variable within the display area;

the matrix arranged in a five-by-five matrix where there are exactly ten unique variables, a plurality of free spaces within the matrix, and a plurality of variables that repeat themselves;

identifying characteristics of a bet printed on the ticket by the lottery gaming terminal, stored on a central processing unit, where said ticket is a winner if the ticket matches all of the selected numeric variables in the subgroup to a gaming operator's variables, the characteristics are identified using the lottery gaming terminal with ticket information retrieved from a central processing unit of a lottery network, where the ticket information includes the ticket identity, information on the value and validity information.

* * * * *